(12) United States Patent
Vancoille et al.

(10) Patent No.: US 6,888,988 B2
(45) Date of Patent: May 3, 2005

(54) SMALL FORM FACTOR ALL-POLYMER OPTICAL DEVICE WITH INTEGRATED DUAL BEAM PATH BASED ON TOTAL INTERNAL REFLECTION OPTICAL TURN

(75) Inventors: Eric Vancoille, Singapore (SG); Adrianus J. P. Van Haasteren, Singapore (SG)

(73) Assignee: Agilent Technologies, Inc., Palo Alto, CA (US)

(*) Notice: Subject to any disclaimer, the term of this patent is extended or adjusted under 35 U.S.C. 154(b) by 136 days.

(21) Appl. No.: 10/389,304

(22) Filed: Mar. 14, 2003

(65) Prior Publication Data
US 2004/0179784 A1 Sep. 16, 2004

(51) Int. Cl.⁷ .................................................. G02B 6/26
(52) U.S. Cl. ............................. 385/47; 385/3; 385/33; 385/36; 385/48
(58) Field of Search ...................... 385/1, 3, 4, 32–38, 385/47, 48

(56) References Cited

U.S. PATENT DOCUMENTS

| 76,173 A | 6/1868 | Jiang et al. |
|---|---|---|
| 4,550,975 A * | 11/1985 | Levinson et al. ............. 385/34 |
| 4,701,010 A | 10/1987 | Roberts |
| 5,515,468 A | 5/1996 | DeAndrea et al. |
| 5,708,743 A | 1/1998 | DeAndrea et al. |
| 5,771,323 A | 6/1998 | Trott |
| 5,894,535 A | 4/1999 | Lemoff et al. |
| 5,930,429 A | 7/1999 | Trott |
| 5,937,114 A | 8/1999 | Fisher et al. |
| 6,031,952 A * | 2/2000 | Lee ............................. 385/47 |
| 6,203,212 B1 | 3/2001 | Rosenberg et al. |
| 6,607,309 B2 * | 8/2003 | Kuhn et al. .................... 385/93 |
| 2002/0181903 A1 | 12/2002 | Kuhn et al. |

FOREIGN PATENT DOCUMENTS

| DE | 195 10 559 | 9/1996 |
|---|---|---|
| EP | 0 890 858 | 1/1999 |
| EP | 0786838 | 10/1999 |
| EP | 0 974 856 | 1/2000 |
| GB | 2330425 | 4/1999 |
| GB | 2360656 | 9/2001 |
| GB | 2374409 | 10/2002 |
| WO | WO 00/79659 | 12/2000 |
| WO | WO 0102887 | 1/2001 |

OTHER PUBLICATIONS

International Search Report issued for PCT/US2004/007645, dated Sep. 1, 2004.

* cited by examiner

Primary Examiner—Phan T. H. Palmer

(57) ABSTRACT

A monolithic optical module of injection-molded high temperature polymeric resin combines an optical turn of typically 90 degrees together with dual or triple beam paths. No additional piece parts are necessary for achieving the optical turn, since this occurs by total internal reflection (TIR), and no additional piece parts are necessary for dual monitoring, which is realized by means of an air-gap functioning as a dual beam-splitter plate. The monolithic optical module further includes integrally surfaces for accurate alignment of the module with external optical elements, and can additionally include integral optical elements, for example lenses and thin film coatings.

27 Claims, 4 Drawing Sheets

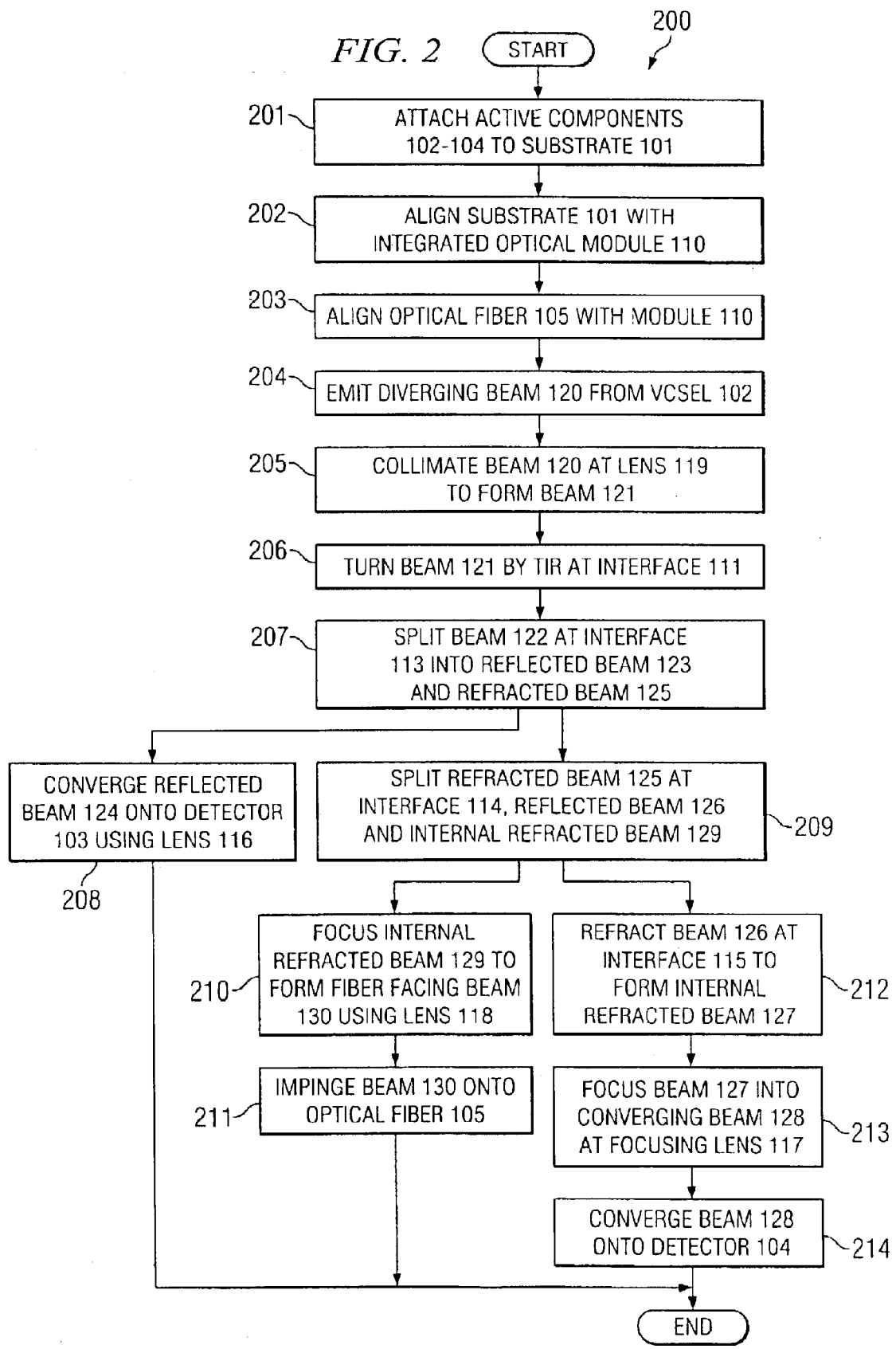

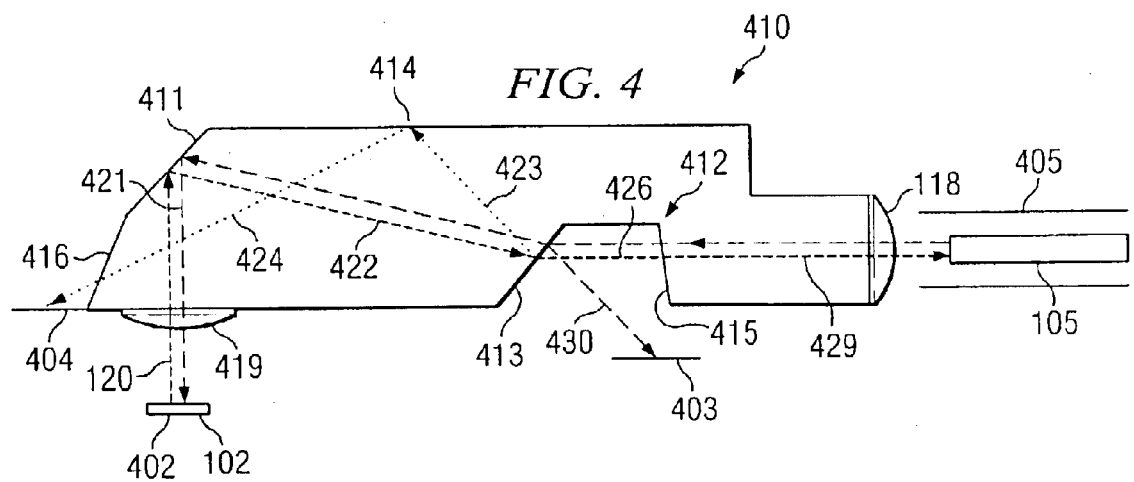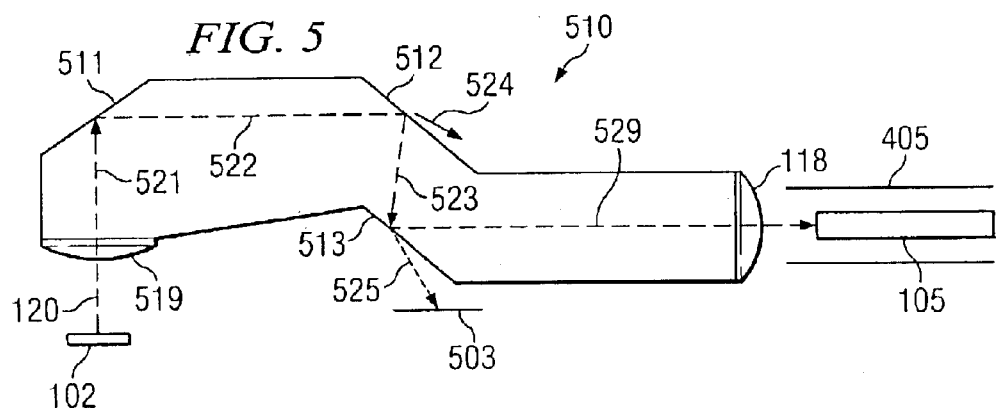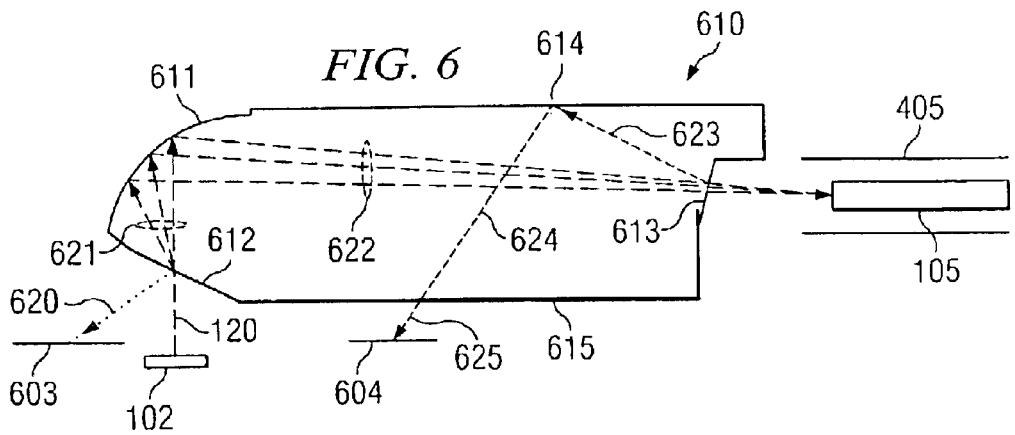

SMALL FORM FACTOR ALL-POLYMER OPTICAL DEVICE WITH INTEGRATED DUAL BEAM PATH BASED ON TOTAL INTERNAL REFLECTION OPTICAL TURN

TECHNICAL FIELD

The present invention relates to optical devices and particularly to small form factor all-polymer optical devices with integrated dual beam paths based on a total internal reflection optical turn.

BACKGROUND OF THE INVENTION

A tilted partial reflective mirror in path of vertical cavity surface emitting laser (VCSEL) for monitoring introduces complex assemblies having various piece parts. Silicon optical benches with built-in optical turn mirrors are expensive, even in large volumes. A monitoring path used in one prior art micro-photonics transmitter device involves individually mounted separate piece optical components (see Fisher et al., U.S. Pat. No. 5,937,114, issued Aug. 10, 1999).

BRIEF SUMMARY OF THE INVENTION

The present invention is directed to a system and method which combine an optical turn of typically 90 degrees together with dual or triple beam paths using a monolithic optical module of injection-molded high temperature resin, for example, polyetherimide, polyimide or polysulfone high-temperature resistant optical polymer. No additional piece parts are necessary for achieving the optical turn, since this occurs by optical total internal reflection (TIR), and no additional piece parts are necessary for dual monitoring, which is realized by means of an air-gap functioning as a dual beam-splitter plate. The monolithic optical module further includes integral surfaces for accurate alignment of the module with external optical elements, and can additionally include integral optical elements, for example lenses and thin film optical coatings.

Among the technical problems addressed by the invention are: Enabling a 90-degree optical turn permitting active optoelectronic devices, for example vertical cavity surface emitting lasers (VCSELs) and optical detectors, to be surface mounted on a substrate orthogonal and at a desired offset distance relative to a transmitter fiber port; minimizing use of diverse materials and/or mounting techniques and separated optical elements to reduce cost when such a optical turn is realized; and providing an integrated single or dual laser monitoring path using an air-gap integrated beam-splitter, thereby further minimizing use of diverse components, materials, separated optical elements, and/or mounting techniques, and consequently reducing cost. Dual path laser monitoring further allows wavelength locking using two detectors with a narrow band optical filter or etalon in the beam path of one of them. Embodiments of the invention allow open fiber control and/or dual direction communication across a single optical fiber.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 2 is a flow diagram 200 depicting the operation of optical assembly 100, in accordance with embodiments of the present invention;

FIG. 4 depicts optical module 410 configured for bi-directional transmitting/receiving;

FIG. 5 depicts optical module 510, providing a TIR transmitted beam path with partial internal reflection at two wedge-like features; and FIG. 6 depicts optical module 610, providing a TIR transmitted beam path in which a TIR interface has curvature that simultaneously focuses the reflected beam in addition to only reflecting the collimated beam.

DETAILED DESCRIPTION OF THE INVENTION

Figure 1:
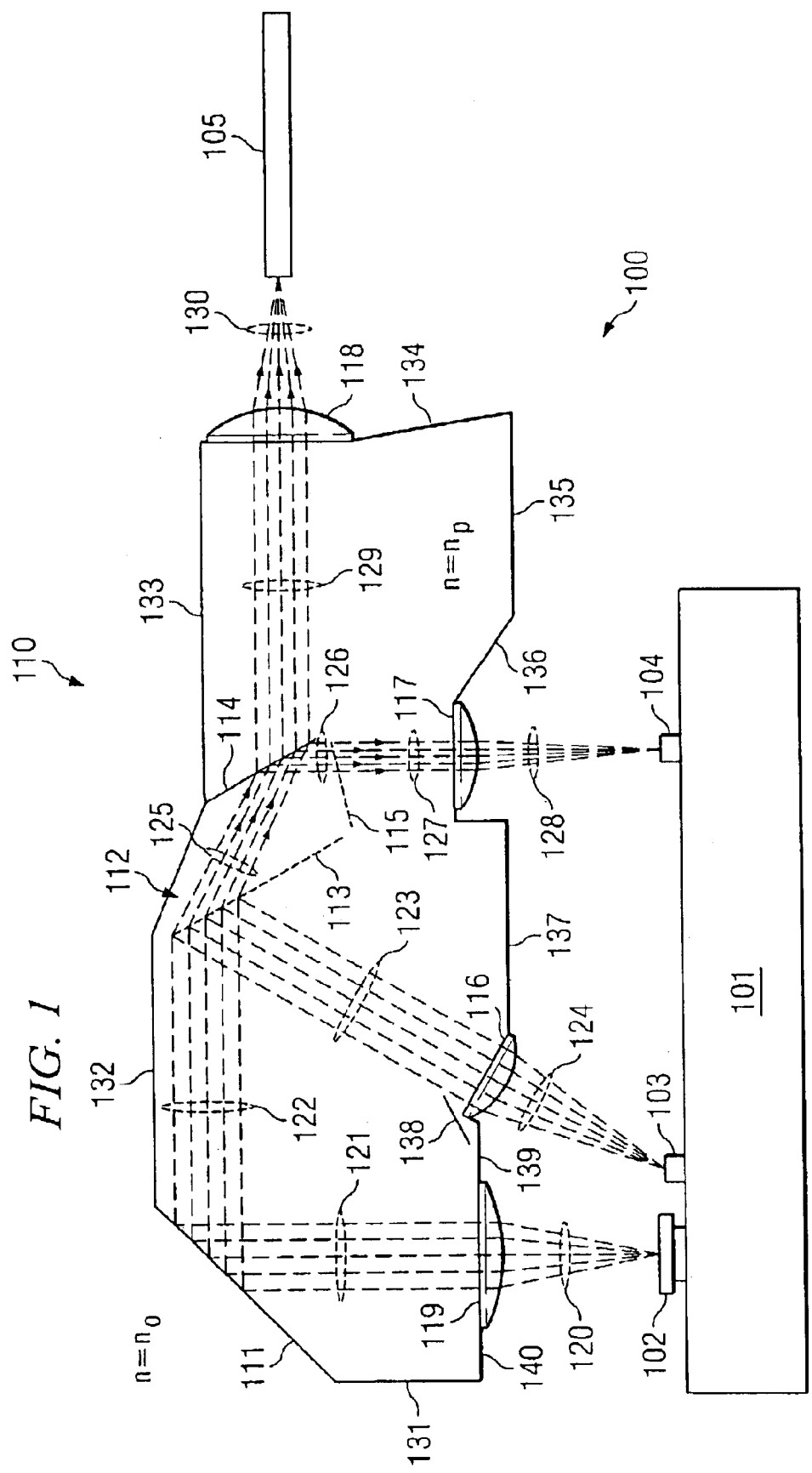
FIG. 1 is a schematic diagram illustrating the structure and functionality of a small form factor all-polymer integrated optical module, in accordance with embodiments of the present invention.

FIG. 1 is a schematic diagram illustrating the structure and functionality of a small form factor all-polymer monolithic optical module, in accordance with embodiments of the present invention. Optical module 110 can integrally incorporate among other optical elements any combination of the following: total internal reflection interface 111 capable of redirecting an optical beam, e.g. through a 90-degree turn; wedge air/polymer/air multiple-interface beam splitter 112 capable of creating a multiple beam path and redirecting the beam path; focusing lenses 116, 117 capable, for example, of focusing a light beam on a detector; fiber facing lens 118 capable of focusing a light beam into an optical fiber; and collimating lens 119 capable of transforming a diverging light beam, for example a laser output beam, to a collimated beam. In addition to the above optical elements which meet optical dimensional and surface finish tolerances, integrated optical module 110 includes non-optical structural walls, for example structural surfaces 131–140, which provide mechanical integrity to the optical elements and can include alignment interfaces with other system components, and which may have opaque or diffuse optical properties.

Integrated optical module 110 is formed of high temperature resin, e.g., polyetherimide, polyimide or polysulfone high-temperature resistant optical polymer by a high-precision polymer fabrication technique, using for example a polymer injection molding process similar to that commonly employed for contact lenses, intraocular lenses, or other ophthalmic elements. All of the optical elements of integrated optical module 110 are formed simultaneously and monolithically from the same material with integrated optical module 110, thereby substantially reducing the cost and complexity of fabrication and enhancing the compactness, alignment precision, and mechanical integrity of optical alignment.

For ease of understanding, in FIG. 1 integrated optical module 110 is depicted as part of optical assembly 100, which also includes optical base or substrate 101 providing attachment for active optical components, for example Vertical Cavity Surface Emitting Laser (VCSEL) 102 and optical detectors 103 and 104; and optical transmitting/receiving fiber 105.

FIG. 2 is a flow diagram 200 depicting the operation of optical assembly 100, in accordance with embodiments of the present invention. At step 201, VCSEL 102 and optical detectors 103, 104 are attached, typically using surface mounting technology, to substrate 101, e.g. a PCB (printed circuit board), which at step 202 is fastened in precise alignment with integrated optical module 110 using for example alignment interfaces on structural surfaces 131–140. In surface mounting technology, components such as capacitors, resistors and ICs (Integrated Circuits) are commonly placed on a surface, e.g., a PCB substrate, by pick-and-place manipulators in a perpendicular placing action and are attached to the surface by use of an epoxy, solder, or other adhesive. At step 203, optical fiber 105 is aligned with optical module 110 using for example a self-aligning fiber port connector integral with optical module 110.

At step 204, VCSEL 102 emits diverging beam 120, which at step 205 is collimated by collimating lens 119 to form collimated beam 121 propagating within the medium of integrated optical module 110. At step 206, collimated beam 121 is turned through an angle by total internal reflection (TIR) from interface 111 to form totally reflected beam 122. This angle can measure 90 degrees, but it can also be larger or smaller depending, e.g., on beam divergence of laser source 102 and/or other properties of a specific embodiment. It is well known in the optical art that light is totally internally reflected when it is incident at an angle greater than or equal to a "critical angle" onto an interface between an incident medium having a refractive index $n=n_p$ and an external medium having a refractive index $n=n_0$, where $n_p>n_0$. Since for most optical polymers, $n_p$ is in the range of 1.43 to 1.73, it is convenient for the external medium to be air or inert gas, which has a refractive index $n_0$ near unity.

Reflected beam 122 then propagates through the polymer medium of integrated optical module 110 and strikes internal/external interface 113 of multiple-interface beam splitter 112, where at step 207 it is split into partially reflected beam 123 into the internal medium and partially refracted beam 125 into the external medium. Partially reflected beam 123 is focused at step 208 by focusing lens 116 to form converging beam 124, which, for example, is captured by optical detector 103. Partially refracted beam 125 propagates through the external medium and at step 209 strikes external/internal interface 114 of multiple-interface beam splitter 112, where it is further split into external reflected beam 126 and internal refracted beam 129. The orientations of interfaces 113 and 114 in combination with the orientation of surface 111 assure that the chief ray of beam 129 impinges perpendicularly onto prealigned optical fiber 105 at step 211, after being focused by fiber facing lens 118 at step 210 to form fiber facing beam 130. External reflected beam 126 propagates through the external medium and at step 212 strikes external/internal interface 115 of multiple-interface beam splitter 112, where it is partially refracted into internal refracted beam 127, which is then focused at step 213 by focusing lens 117 into converging beam 128, which, for example, is captured at step 214 by optical detector 104.

The purposes of dual/multiple detectors 103, 104 include monitoring the intensity of the light signal as emitted by laser source 102; providing for bi-directional communication across single optical fiber 105; and wavelength locking of laser source 102. For the latter purpose, two detectors 103, 104 are utilized, one having a narrow-band (half width passband typically <0.5 nm) interference filter or an etalon in its path, for example internal refracted beam path 127. The signals generated by both detectors provide a measure of the wavelength of laser source 102 and stabilize the transmitter to a desired wavelength by changing its operating conditions (e.g., drive current) and/or external environment conditions, for example laser temperature.

Figure 3A:
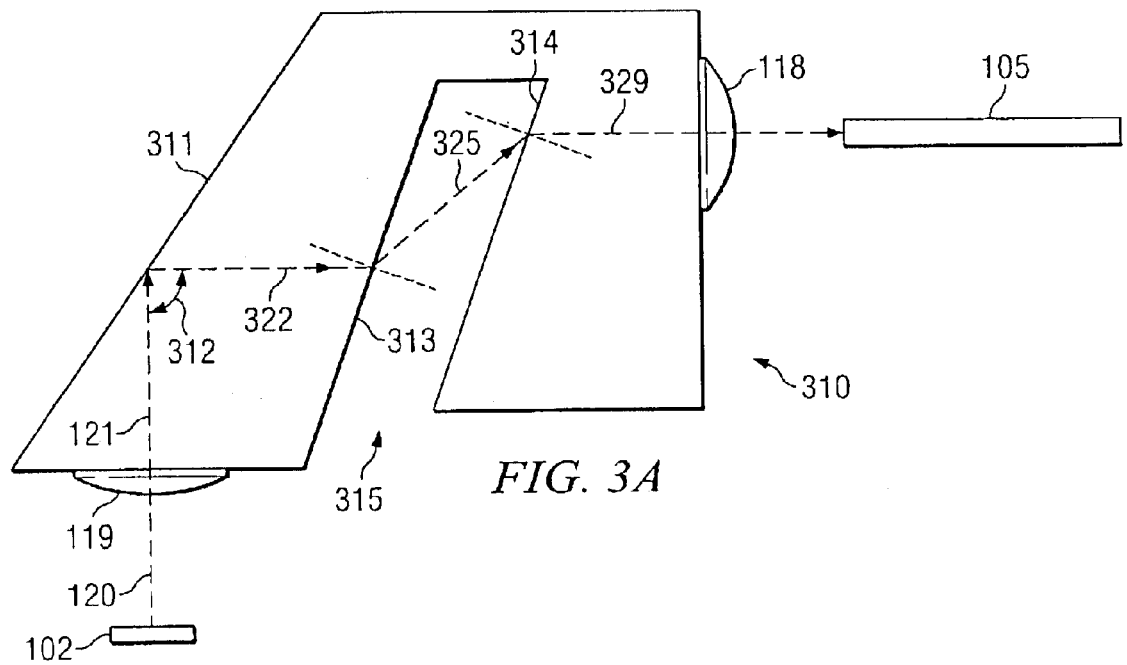
FIGS. 3A–3B depict two alternative configurations for generating an output beam offset and parallel relative to the input beam axis.
Figure 3B:
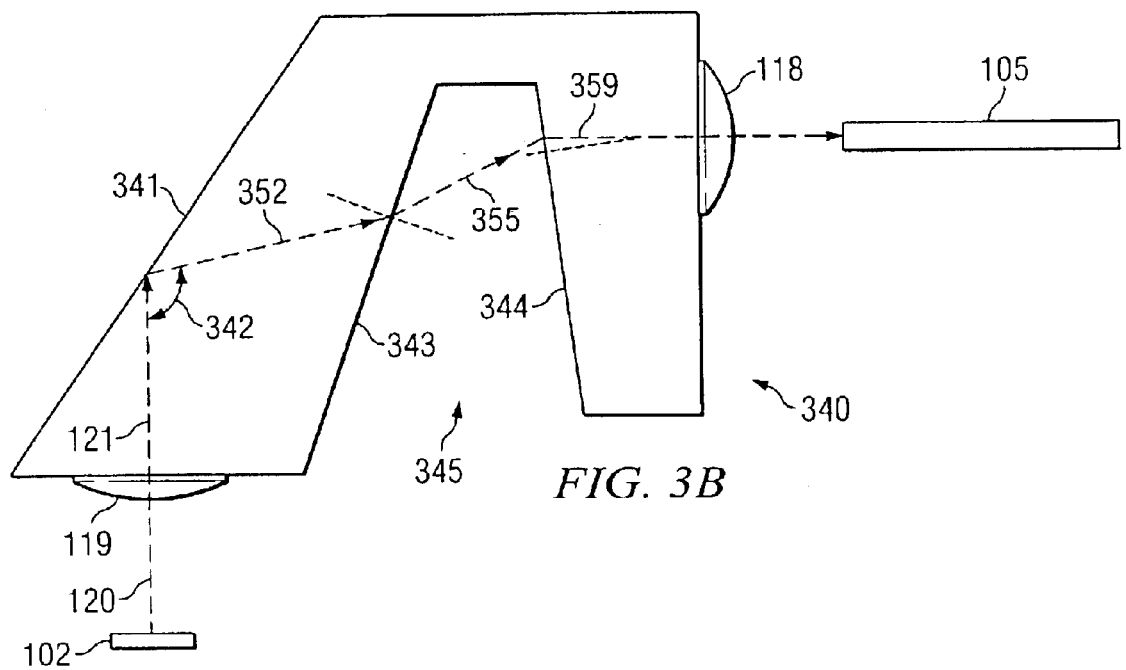

Embodiments of the present invention are not limited to the optical beam path shown in FIG. 1, but include alternative configurations which embody the principles of the present invention, including TIR optical turn and means to tap and monitor the transmitted signal beam by using the reflections from a slanted, parallel, or wedged air/polymer interface. FIGS. 3A–3B depict two alternative configurations for generating an output beam offset and parallel relative to the input beam axis, i.e. 90-degree turn at surface 311 or non-90-degree turn at surface 341 compensated by refraction at surfaces 343 and 344. In module 310 depicted in FIG. 3A, VCSEL source 102 emits diverging beam 120, which is collimated by collimating lens 119 integral to module 310 to form collimated beam 121. Beam 121 in turn is reflected at a 90-degree angle 312 by TIR at interface 311, forming horizontal beam 322. Air gap beam splitter 315 includes parallel partially reflective interface surfaces 313, 314, which are disposed diagonally relative to horizontal beam 322, which is then refracted upward at first interface surface 313 to form refracted beam 325 and is refracted again at second interface surface 314 to form offset beam 329 parallel to horizontal beam 322. Module 310 has been configured and oriented to insure that offset beam 329 is at an appropriate height to be focused accurately onto optical fiber 105 by integral fiber facing lens 118.

Similarly, in module 340 of FIG. 3B, VCSEL source 102 emits diverging beam 120, which is collimated by collimating lens 119 integral to module 340 to form collimated beam 121. Beam 121 in turn is reflected at a non-90 degree angle 342 by TIR at interface 341, forming diagonal beam 352. Wedged air gap beam splitter 345 includes non-parallel partially reflective interface surfaces 343, 344, which are disposed such that horizontal beam 352 is refracted upward at first interface surface 343 to form refracted beam 355 and is refracted again at second interface surface 344 to form offset beam 359 aligned and parallel to the axis of optical fiber 105. Module 340 has been configured and oriented such that offset beam 329 is focused accurately onto optical fiber 105 by integral fiber facing lens 118. In general module 310 in FIG. 3A is advantageous relative to module 340 in FIG. 3B because of optical performance as well as manufacturability.

FIGS. 4, 5, and 6 illustrate various configurations for generating multiple beam paths.

FIG. 4 depicts optical module 410 configured for bi-directional transmitting/receiving. VCSEL 102 emits diverging beam 120, which is collimated by integral lens 419 to form collimated beam 421. Beam 421 is reflected at a non-90-degree angle by TIR interface 411 to form downward slanted beam 422. At wedge interface 413 of air gap beam splitter 412, beam 422 is partially reflected to form beam 423 and partially refracted to form beam 426, which propagates through interface 415 to form output beam 429 that is focused by fiber facing lens 118 onto optical fiber 105 in integral port connector 405. Partially reflected beam 423 is reflected at TIR interface 414 to form monitor beam 424, which propagates through interface 416 onto monitor detector 404. Received beam from optical fiber 105 is collimated by integral fiber facing lens 118 and retraces the paths of beams 429 and 426. At interface 413, the received beam is partially reflected to form beam 430, which is then detected by transceiver detector 403, and is partially refracted to retrace the paths of beams 422 and 421 through TIR turn at interface 411 and then through collimating lens 419 onto monitor diode 402 situated behind VCSEL source 102.

Alternatively, on interface 413 is a thin film optical coating which has two functions: (1) attenuate the received signal beam to a desired power level; (2) produce a second monitoring beam, which can be detected by a photodiode mounted under it. A single optical communication fiber is utilized to transport information both to and from transceiver module 410. Embodiments of the present invention can also be used when the transmitted path carries a signal into the optical fiber, is monitored through a dual path, and a received signal is guided along a triple path. If the received signal is at a distinctly different wavelength from the transmitted wavelength, optical module 410 is part of a dual transceiver, e.g., sending at 1550 nm and receiving at 1310 nm, operating in a bi-directional communication mode. The information of the two signals, transmitted and received, can pass through the same optical fiber without interfering, because they occur at different wavelengths. The incoming signal is guided to the desired detector by use of thin film coating on interface 413, which, e.g., reflects 1310 nm but transmits 1550 nm.

Open fiber control is a technology that allows a communication system to detect if an optical communication channel has been established, i.e., if a closed link from transmitter to receiver is present. By use of open fiber control, the light power launched into an optical fiber can be increased, thus allowing longer communication distances and/or improved signal quality, while still meeting eye safety requirements. One way to implement open fiber control is by use of transceiver pairs, such that the transmitter of a first transceiver is connected to the receiver of a second transceiver, while at the same time the transmitter of the second transceiver is connected to the receiver of the first transceiver. The configurations of the first and second transceivers can be similar but are not necessarily limited to that of optical module 410 shown in FIG. 4.

FIG. 5 depicts optical module 510, providing a TIR transmitted beam path with partial internal reflection at two wedge-like features, which (1) attenuate the transmitted beam to a desired level; (2) generate a monitoring path; and (3) offset the transmitted beam to a desired fiber port height above or below the input beam axis. VCSEL 102 emits diverging beam 120, which is collimated by integral lens 519 to form collimated beam 521. Beam 521 is reflected in a 90-degree turn by TIR interface 511 to form horizontal reflected beam 522. At first wedge interface 512, beam 522 is partially refracted to form output beam 524 (which is discarded in the present example) and partially reflected to form internal beam 523. At second wedge interface 513, internal beam 523 is partially refracted to form monitoring beam 525 incident on monitor detector 503 and is partially reflected to form horizontal output beam 529, which is then focused by integral fiber facing lens 118 onto optical transmitting fiber 105 in integral port connector 405. Horizontal output beam 529 propagates parallel to but offset from horizontal reflected beam 522.

FIG. 6 depicts optical module 610, providing a TIR transmitted beam path in which a TIR interface has curvature that simultaneously focuses the reflected beam in addition to only reflecting the collimated beam as illustrated in FIG. 1 through FIG. 5. VCSEL 102 emits diverging beam 120, which at interface 612 is partially refracted to form diverging beam 621 and partially reflected to form monitoring beam 620 incident on monitor detector 603. Diverging beam 621 is simultaneously reflected and focused by curved TIR interface 611, forming output beam 622, which is focused onto optical transmitting fiber 105 in integral port connector 405. At interface 613, a portion of output beam 622 is reflected to form sampling beam 623, which is reflected at TIR interface 614 to form monitoring beam 624, which propagates through interface 615 to form monitoring beam 625 incident on monitor detector 604.

The single block, all-polymer, molded, implementation allows port connector 405, which can include a variety of connectors, to be molded in one piece integral with optical module 410, 510, 610. In surface mounting technology, components such as capacitors, resistors and ICs (Integrated Circuits) are placed on a surface, e.g., a PCB substrate, by pick-and-place manipulators in a perpendicular placing action and are attached to the surface by use of an epoxy, solder, or other adhesive. The provision of structural surfaces and alignment features also included in optical module 410, 510, 610 allows the lens to be mounted on the surface of a printed circuit board as explained above.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A monolithic optical module for an optical assembly, said optical module comprising:
   a total internal reflection (TIR) interface surface turning an incident optical beam through a predetermined angle;
   at least one beam splitter surface adjacent an air gap, said beam splitter surface partially reflecting an incident optical beam to provide a partially reflected beam and partially refracting said incident optical beam to provide a partially refracted beam; and at least one integral surface providing accurate alignment of said monolithic optical module with elements of said optical assembly external to said monolithic optical module.

2. The optical module of claim 1 wherein said optical assembly further comprises a substrate aligned adjacent said monolithic optical module, said substrate attached to at least one active optoelectronic device.

3. The optical module of claim 2 wherein said at least one active optoelectronic device is attached to said substrate using surface mounting technology.

4. The optical module of claim 2 wherein said at least one integral surface provides alignment of said optical module with said substrate.

5. The optical module of claim 2 wherein said at least one beam splitter surface cooperatively with said TIR interface surface offsets the path of an output optical beam by a predetermined distance relative to the surface of said at least one active optoelectronic device.

6. The optical module of claim 2 wherein said optical assembly further comprises an optical fiber port orthogonal to the surface of said at least one active optoelectronic device.

7. The optical module of claim 2 wherein said at least one active optoelectronic device is selected from the group consisting of vertical cavity surface emitting lasers (VCSELs) and optical detectors.

8. The optical module of claim 1 wherein said at least one beam splitter surface provides at least one beam path split from said incident optical beam for monitoring a property of said incident optical beam.

9. The optical module of claim 8 wherein said property is selected from the group consisting of power and wavelength.

10. The optical module of claim 1 wherein said optical assembly further comprises an optical communication fiber aligned adjacent said optical module.

11. The optical module of claim 10 wherein said at least one integral surface comprises an integral fiber port connector providing alignment of said optical module with said optical communication fiber.

12. The optical module of claim 1 wherein said at least one beam splitter surface comprises a plurality of said beam splitter surfaces, providing a plurality of beam paths.

13. The optical module of claim 1 wherein said TIR interface surface includes curvature.

14. The optical module of claim 1 consisting of substantially single material high-temperature resistant optical polymer.

15. The optical module of claim 1 further comprising integrally at least one optical element selected from the group consisting of integral lenses and thin film optical coatings, said thin film optical coating being adhered to at least one said beam splitter surface.

16. A method of operating a monolithic optical module for an optical assembly, said method comprising:

obtaining an input optical beam;

turning said input optical beam by total internal reflection from a total internal reflection (TIR) interface surface integral with said monolithic optical module to provide a reflected beam;

splitting said reflected beam by a beam splitter surface adjacent an air gap integral with said monolithic optical module to provide a partially reflected beam and a partially refracted beam; and focusing an output beam selected from the group consisting of said partially reflected beam and said partially refracted beam onto an optical fiber using a lens integral with said monolithic optical module.

17. The method of claim 16 further comprising directing an unselected beam from the group consisting of said partially reflected beam and said partially refracted beam onto the surface of an optical detector.

18. The method of claim 17 further comprising:

multiply-splitting said reflected beam by a plurality of said beam splitter surfaces adjacent said air gaps to provide a plurality of said partially reflected beams and said partially refracted beams;

focusing one of said plurality of beams onto an optical fiber using a lens integral with said monolithic optical module; and directing a beam of said plurality of beams onto the surface of an optical detector.

19. The method of claim 18 wherein said beam directed onto said surface of said optical detector is used for monitoring a property of said incident optical beam.

20. The method of claim 19 wherein said property is selected from the group consisting of power and wavelength.

21. The method of claim 18 wherein said directing further comprises focusing said directed beam onto the surface of said optical detector using a focusing lens integral with said monolithic optical module.

22. The method of claim 16 comprising operating said optical assembly as a transceiver.

23. The method of claim 22 further comprising operating said transceiver bi-directionally through a single optical fiber at two distinct wavelengths separated by an optical filter in the path of a monitor beam.

24. The method of claim 22 further comprising operating said transceiver including open fiber control.

25. The method of claim 16 wherein said obtaining further comprises:

attaching an optical source to a substrate;

aligning said substrate with said monolithic optical module; and emitting an input optical beam from said optical source into said monolithic optical module.

26. The method of claim 25 wherein said beam splitter surface cooperatively with said TIR interface surface offsets the path of an output optical beam by a predetermined distance relative to the surface of said optical source.

27. The method of claim 16 wherein said obtaining further comprises collimating said input optical beam using a collimating lens integral with said monolithic optical module.

* * * * *